(12) United States Patent
Oliver et al.

(10) Patent No.: US 9,310,193 B2
(45) Date of Patent: Apr. 12, 2016

(54) STABILIZING ORIENTATION VALUES OF AN ELECTRONIC DEVICE

(75) Inventors: Robert George Oliver, Waterloo (CA); Adam Louis Parco, Kitchener (CA); Nathan Daniel Pozniak Buchanan, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 651 days.

(21) Appl. No.: 13/597,387

(22) Filed: Aug. 29, 2012

(65) Prior Publication Data
US 2014/0067305 A1 Mar. 6, 2014

(51) Int. Cl.
*G01C 17/38* (2006.01)
*G01B 21/16* (2006.01)
*G01C 17/28* (2006.01)
*G01C 21/16* (2006.01)
*G06F 11/30* (2006.01)

(52) U.S. Cl.
CPC ............... *G01B 21/16* (2013.01); *G01C 17/28* (2013.01); *G01C 21/165* (2013.01)

(58) Field of Classification Search
CPC ....................................................... G01B 21/16
See application file for complete search history.

(56) References Cited

U.S. PATENT DOCUMENTS

2011/0172918 A1* 7/2011 Tome .......................... 701/220
2011/0178707 A1* 7/2011 Sachs et al. ................ 701/216
2012/0173195 A1 7/2012 Opshaug et al.

FOREIGN PATENT DOCUMENTS

WO 2012044964 A2 4/2012

OTHER PUBLICATIONS

EPO, Extended European Search Report relating to application No. 12182153.2 dated Feb. 4, 2013.
CA, CA Office Action relating to Application No. 2,822,336, dated Oct. 7, 2015.

* cited by examiner

*Primary Examiner* — Phuong Huynh
(74) *Attorney, Agent, or Firm* — Rowand LLP

(57) ABSTRACT

Disclosed are methods and systems for stabilizing orientation values of an electronic device, the orientation values representing an orientation of the electronic device, the method comprising: obtaining first sensor readings from a first sensor; obtaining second sensor readings from a second sensor; evaluating the first sensor readings and the second sensor readings to determine whether the electronic device is stationary; locking the orientation values when the electronic device is stationary; collecting at least one of further first sensor readings and further second sensor readings while the orientation values are locked; determining whether the orientation of the electronic device is changing by more than a threshold amount based on one or more of the further first sensor readings and the further second sensor readings; and unlocking the orientation values for updating based on the further sensor readings when the orientation of the electronic device is changing by more than the threshold amount.

20 Claims, 4 Drawing Sheets

STABILIZING ORIENTATION VALUES OF AN ELECTRONIC DEVICE

TECHNICAL FIELD

The present disclosure relates generally to electronic device orientation and, more particularly, to stabilizing orientation values of an electronic device.

BACKGROUND

An electronic device can include or be associated with one or more sensors, such as a gyroscope, magnetometer and/or accelerometer. The sensors can be used to estimate or calculate the orientation of the electronic device and/or the change in orientation of the electronic device.

A magnetometer is a device that can be used to measure the strength of magnetic fields. An accelerometer is a device that can be used to measure acceleration. A gyroscope is a device that can be used to measure rotation rate. Gyroscopes are sometimes included in electronic devices, such as handheld electronic devices, in order to provide information about the orientation of such electronic devices. Such orientation information allows the electronic device to know information about its own physical position. For example, the gyroscope may allow for recognition of movement within a three dimensional space. One or both of the magnetometer and accelerometer can be included in electronic devices in order to provide information about the orientation of such electronic devices relative to the Earth's axes.

The electronic device may use such orientation information as an input signal. That is, the electronic device may be operated in a mode in which gyroscope measurements affect the operation of the electronic device.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
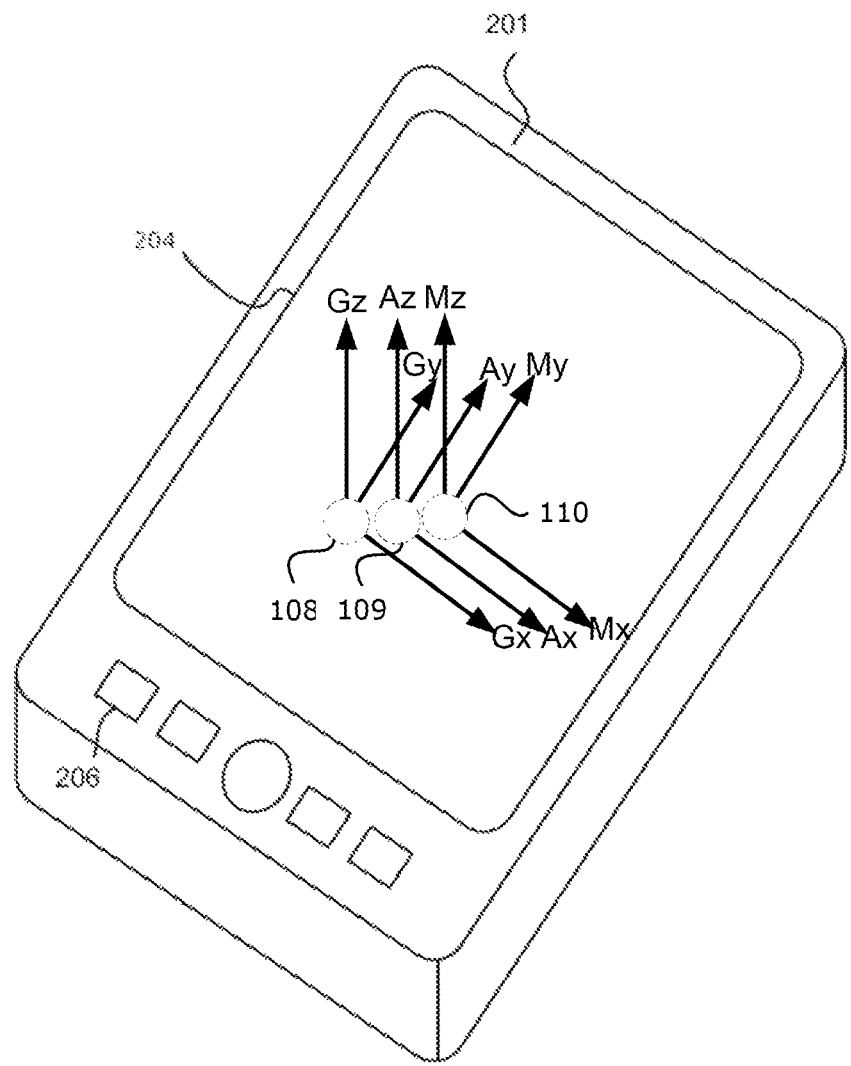
FIG. 1 is a perspective view of an electronic device in accordance with example embodiments of the present disclosure.

In one aspect, the present disclosure describes a method of stabilizing orientation values of an electronic device, the orientation values representing an orientation of the electronic device, the method comprising: obtaining first sensor readings from a first sensor; obtaining second sensor readings from a second sensor; evaluating the first sensor readings and the second sensor readings to determine whether the electronic device is stationary; locking the orientation values when the electronic device is stationary; collecting at least one of further first sensor readings and further second sensor readings while the orientation values are locked; determining whether the orientation of the electronic device is changing by more than a threshold amount based on one or more of the further first sensor readings and the further second sensor readings; and unlocking the orientation values for updating based on the further sensor readings when the orientation of the electronic device is changing by more than the threshold amount.

In another aspect, the method can also include determining that the further accelerometer readings and the magnetometer readings are within a benchmark value; calculating the reference position using the further accelerometer readings and the magnetometer readings; and while the orientation values are unlocked, correcting the orientation values using the calculated reference position.

In another aspect, the present disclosure describes an electronic device comprising: a memory; a first sensor for providing first sensor readings in respect of at least one first sensor axis; a second sensor for providing second sensor readings in respect of at least one second sensor axis; and, a processor coupled to the memory, the first sensor, and the second sensor the processor being configured to stabilize the orientation values of the electronic device by: obtaining first sensor readings from a first sensor; obtaining second sensor readings from a second sensor; evaluating the first sensor readings and the second sensor readings to determine whether the electronic device is stationary; locking the orientation values when the electronic device is stationary; collecting at least one of further first sensor readings and further second sensor readings while the orientation values are locked; determining whether the orientation of the electronic device is changing by more than a threshold amount based on one or more of the further first sensor readings and the further second sensor readings; and unlocking the orientation values for updating based on the further sensor readings when the orientation of the electronic device is changing by more than the threshold amount.

In another aspect, the present disclosure describes a computer readable storage medium comprising computer-executable instructions for controlling sensor use on an electronic device by: obtaining the first sensor readings; obtaining the second sensor readings; evaluating the first sensor readings and the second sensor readings to determine that the orientation of the electronic device is stationary; locking the orientation values; collecting at least one of first sensor readings and second sensor readings while the orientation values are locked; determining that the orientation of the electronic device is changing by more than a threshold amount based on one or more of the first sensor readings and second sensor readings collected while the orientation values were locked; and unlocking the orientation values.

Other aspects of the present disclosure will be described below.

Example Electronic Device

Electronic devices mayسometimes benefit from knowledge about their own orientation. For example, electronic devices are sometimes configured to operate based on the orientation of the electronic device. That is, the orientation of the electronic device may act as an input to an application, system or process whose actions depend on the orientation of the electronic device. For example, a display screen on a display of the electronic device may depend on the orientation of the electronic device. By way of example, the display screen may toggle between landscape and portrait orientations based on the orientation of the electronic device.

Thus, in at least some embodiments, the electronic device may benefit from knowledge about the orientation of the electronic device.

Referring first to FIG. 1, an example electronic device 201 is illustrated. In the embodiment illustrated, the electronic device 201 is a handheld mobile communication device. However, the electronic device 201 may take a variety of forms. By way of example, the electronic device may be a global positioning system (GPS) unit, an inertial navigation system (INS), a mobile communication device such as a mobile phone or smartphone, a tablet computer, a laptop computer, a wearable computer such as a watch, a camera, or an electronic device of another type.

In some embodiments, the electronic device 201 includes a display 204, such as a liquid crystal display (LCD), and an input interface 206, such as a keyboard or keypad or a navigation tool such as a clickable scroll wheel (also referred to as a track wheel or thumbwheel) or trackball. Other examples of an input interface 206 can include a touchpad or an optical input device. In some embodiments, the display 204 may be a touchscreen display which permits a user to provide input to the electronic device 201 by touching the display 204. That is, the display 204 may act as an input interface 206 to the electronic device 201, providing the electronic device 201 with an electronic signal generated in response to user contact with the touchscreen display.

The electronic device 201 includes one or more sensors, which may be used by the electronic device 201 to determine the orientation of the electronic device 201. In the example embodiment illustrated, the electronic device 201 includes a gyroscope 108. The gyroscope 108 measures rotational velocity of the gyroscope 108. In the embodiment illustrated, since the gyroscope 108 is integrated within the electronic device 201, the gyroscope 108 effectively measures rotational velocity of the electronic device 201. In the illustrated embodiment, the gyroscope 108 is illustrated using a circle, which is shown using a broken line to reflect the fact that the gyroscope 108 may be internally mounted within the electronic device 201. While the circular gyroscope 108 is useful for the purposes of illustration, the gyroscope 108 will typically take other forms. For example, the gyroscope 108 may have a standard electronic chip form factor.

The gyroscope 108 contains one or more sensing axis. In the embodiment illustrated, the gyroscope 108 includes three orthogonal sensing axes denoted Gx (to represent the gyroscope's x sensing axis), Gy (to represent the gyroscope's y sensing axis) and Gz (to represent the gyroscope's z sensing axis). Each sensing axis is orthogonal to the other sensing axes. For example, the x sensing axis (Gx) is orthogonal to the y and z sensing axes (Gy and Gz respectively), the y sensing axis (Gy) is orthogonal to the x and z sensing axes (Gx and Gz respectively) and the z sensing axis (Gz) is orthogonal to the x and y sensing axes (Gx and Gy respectively).

The gyroscope 108 may produce a gyroscope reading for each of the sensing axes, Gx, Gy, Gz. For example, a gyroscope reading $w_x$ may be produced by the gyroscope based on gyroscope measurements associated with the x sensing axis (such as a rotation about the x sensing axis), a gyroscope reading $w_y$ may be produced by the gyroscope based on gyroscope measurements associated with the y sensing axis (such as a rotation about the y sensing axis), and a gyroscope reading $w_z$ may be produced by the gyroscope based on gyroscope measurements associated with the z sensing axis (such as a rotation about the z sensing axis). These gyroscope readings collectively form the gyroscope output. That is, the gyroscope output is an electronic signal which is representative of the gyroscope readings $w_x$, $w_y$, $w_z$ for the sensing axes Gx, Gy, Gz of the gyroscope 108. The electronic signal may, for example, provide the gyroscope readings $w_x$, $w_y$, $w_z$ for the sensing axes Gx, Gy, Gz of the gyroscope 108 as measures of an amount of rotation per unit time about each sensing axis. For example, the gyroscope 108 may produce an output in terms of radians per second or degrees per second. The gyroscope output may, in some embodiments, be an analog output. In other embodiments, the gyroscope output may be digital. A gyroscope reading captured at a point in time may be referred to as a gyroscope sample. Such samples may be obtained, for example, at regular intervals. A gyroscope reading can be obtained with respect to one axis (e.g. the Gx axis) independent of obtaining the gyroscope readings with respect to another axis (e.g. the Gy axis) or with respect to the remaining axes (e.g. the Gy axis and the Gz axis). Further, the intervals at which the readings for one axis (e.g. the Gx axis) are obtained can be independent of timing at which the readings for another axis (e.g. the Gy axis) or the remaining axes (e.g. the Gy axis and the Gz axis) are obtained.

The gyroscope output may separate the gyroscope readings for each sensing axis at a signal level or at an output interface level, or both. For example, in some embodiments, the gyroscope 108 may have a separate output interface (such as a separate pad or pin) associated with each sensing axis. Each output interface associated with a sensing axis may provide an output signal representing gyroscope readings for its associated sensing axis (thus separating the gyroscope readings for the sensing axes at an output interface level). In other example embodiments, a common output interface (such as a common pad or pin) may be associated with a plurality of sensing axes. That is, gyroscope readings for a plurality of sensing axes may be provided on a common output interface (such as a common pad or pin).

In some embodiments, the gyroscope 108 may be a digital gyroscope provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201.

The sensing axes Gx, Gy, Gz of the gyroscope 108 may be aligned with the form factor of the electronic device 201. For example, in the embodiment illustrated the axes are aligned such that, when the electronic device 201 is oriented on a flat surface, such as a table, the x and y sensing axes are parallel to the table and the z sensing axis is perpendicular to the table. It is contemplated that the sensing axes x, y, z may be aligned with different features of the electronic device 201 in other embodiments.

The electronic device 201 may also include an accelerometer 109. An accelerometer 109 is a device that generates an output signal in dependence on the acceleration of the accelerometer 109. That is, the accelerometer 109 produces an output which reflects the acceleration of the accelerometer. More particularly, the accelerometer 109 may generate an output which specifies the magnitude and/or direction of acceleration. In the embodiment illustrated, since the accelerometer 109 is integrated within the electronic device 201, the accelerometer 109 effectively measures the acceleration of the electronic device 201.

In the illustrated embodiment, the accelerometer 109 is illustrated using a circle, which is shown using a broken line to reflect the fact that the accelerometer 109 may be internally mounted within the electronic device 201. While the circular accelerometer 109 is useful for the purposes of illustration, the accelerometer 109 will typically take other forms. For example, the accelerometer 109 may have a standard electronic chip form factor.

In some embodiments, the accelerometer 109 may be a digital accelerometer provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201.

The accelerometer 109 defines one or more sensing axis. In the embodiment illustrated, the accelerometer 109 includes three orthogonal sensing axes denoted Ax (to represent the accelerometer's x sensing axis), Ay (to represent the accelerometer's y sensing axis) and Az (to represent the accelerometer's z sensing axis). Each sensing axis is orthogonal to the other sensing axes. For example, the x sensing axis (Ax) is orthogonal to the y and z sensing axes (Ay and Az respectively), the y sensing axis (Ay) is orthogonal to the x and z sensing axes (Ax and Az respectively) and the z sensing axis (Az) is orthogonal to the x and y sensing axes (Ax and Ay respectively).

The accelerometer 109 may produce an accelerometer reading for each of the sensing axes, Ax, Ay, Az. For example, an accelerometer reading $a_x$ may be produced by the accelerometer 109 based on accelerometer measurements associated with the x sensing axis (such as an acceleration along the x sensing axis), an accelerometer reading $a_y$ may be produced by the accelerometer 109 based on accelerometer measurements associated with the y sensing axis (such as an acceleration along the y sensing axis), and an accelerometer reading $a_z$ may be produced by the accelerometer 109 based on accelerometer measurements associated with the z sensing axis (such as an acceleration along the z sensing axis). These accelerometer readings collectively form the accelerometer output. That is, the accelerometer output is an electronic signal which is representative of the accelerometer readings $a_x$, $a_y$, $a_z$ for the sensing axes Ax, Ay, Az of the accelerometer 109. The accelerometer readings with respect to each of the three axes Ax, Ay, Az of the accelerometer 109 can be taken at intervals, which may be predetermined. The intervals for when accelerometer readings can be taken with respect to each of the three axes Ax, Ay, Az can each be independent of the others.

As shown in FIG. 1, the sensing axes Ax, Ay, Az of the accelerometer 109 may be aligned with the form factor of the electronic device 201. In the embodiment illustrated, the x and y sensing axes (Ax and Ay) are generally parallel to the front face of the electronic device and the z sensing axis (Az) is generally perpendicular to the front face of the electronic device. One or more of the sensing axes Ax, Ay, Az of the accelerometer 109 may be aligned with one or more of the sensing axes Gx, Gy, Gz of the gyroscope 108.

The electronic device 201 may also include a magnetometer 110. The magnetometer 110 (which may also be referred to as a digital compass) is a measuring instrument that is used to measure the strength and/or direction of magnetic fields. That is, the magnetometer 110 generates an electronic signal that reflects the direction and/or strength of a magnetic field in the vicinity of the magnetometer 110. Since the magnetometer 110 is mounted within the electronic device 201, the magnetometer 110 effectively reflects the direction and/or strength of a magnetic field acting on the electronic device 201.

In the illustrated embodiment, the magnetometer 110 is illustrated using a circle, which is shown using a broken line to reflect the fact that the magnetometer 110 may be internally mounted within the electronic device 201. While the circular magnetometer 110 is useful for the purposes of illustration, the magnetometer 110 will typically take other forms. For example, the magnetometer 110 may have a standard electronic chip form factor.

In some embodiments, the magnetometer 110 may be a digital magnetometer provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201.

The magnetometer 110 is, in at least some embodiments, a three axis magnetometer 110 that defines three sensing axes Mx, My, Mz. In the embodiment illustrated, the magnetometer 110 includes three orthogonal sensing axes denoted Mx (to represent the magnetometer's x sensing axis), My (to represent the magnetometer's y sensing axis) and Mz (to represent the magnetometer's z sensing axis). Each sensing axis is orthogonal to the other sensing axes. For example, the x sensing axis (Mx) is orthogonal to the y and z sensing axes (My and Mz respectively), the y sensing axis (My) is orthogonal to the x and z sensing axes (Mx and Mz respectively) and the z sensing axis (Mz) is orthogonal to the x and y sensing axes (Mx and My respectively).

The magnetometer 110 may produce a magnetometer reading for each of the sensing axes, Mx, My, Mz. For example, a magnetometer reading $m_x$ may be produced by the magnetometer 110 based on magnetometer measurements associated with the x sensing axis (such as a magnetic field along the x sensing axis), a magnetometer reading $m_y$ may be produced by the magnetometer 110 based on magnetometer measurements associated with the y sensing axis (such as a magnetic field along the y sensing axis), and a magnetometer reading $m_z$ may be produced by the magnetometer 110 based on magnetometer measurements associated with the z sensing axis (such as a magnetic field along the z sensing axis). These magnetometer readings collectively form the magnetometer output. That is, the magnetometer output is an electronic signal which is representative of the magnetometer readings $m_x$, $m_y$, $m_z$ for the sensing axes Mx, My, Mz of the magnetometer 110. The magnetometer readings with respect to each of the three axes Mx, My, Mz of the magnetometer 110 can be taken at intervals, which may be predetermined. The intervals for when magnetometer readings can be taken with respect to each of the three axes Mx, My, Mz can each be independent of the others.

As shown in FIG. 1, the sensing axes Mx, My, Mz of the magnetometer 110 may be aligned with the form factor of the electronic device 201. In the embodiment illustrated, the x and y sensing axes (Mx and My) are generally parallel to the front face of the electronic device 201 and the z sensing axis (Mz) is generally perpendicular to the front face of the electronic device 201. One or more of the sensing axes Mx, My, Mz of the magnetometer 110 may be aligned with one or more of the sensing axes Gx, Gy, Gz of the gyroscope 108 and/or one or more sensing axes Ax, Ay, Az of the accelerometer 109. In accordance with an exemplary embodiment, the Mx axis is aligned with both the Gx and Ax axes; the My axis is aligned with both the Gy and Ay axes; the Mz axis is aligned with both the Gz and Az axes; and the axes of each of the gyroscope 108, accelerometer 109 and magnetometer 110 are aligned with the form factor of the electronic device 201.

While FIG. 1 illustrates three separate sensors (e.g. a gyroscope 108, an accelerometer 109, and a magnetometer 110), in some embodiments, two or more of these sensors may be provided in a common packaging, such as a common electronic chip. For example, in some embodiments, a single electronic chip may include both an accelerometer 109 and a magnetometer 110.

Figure 2:
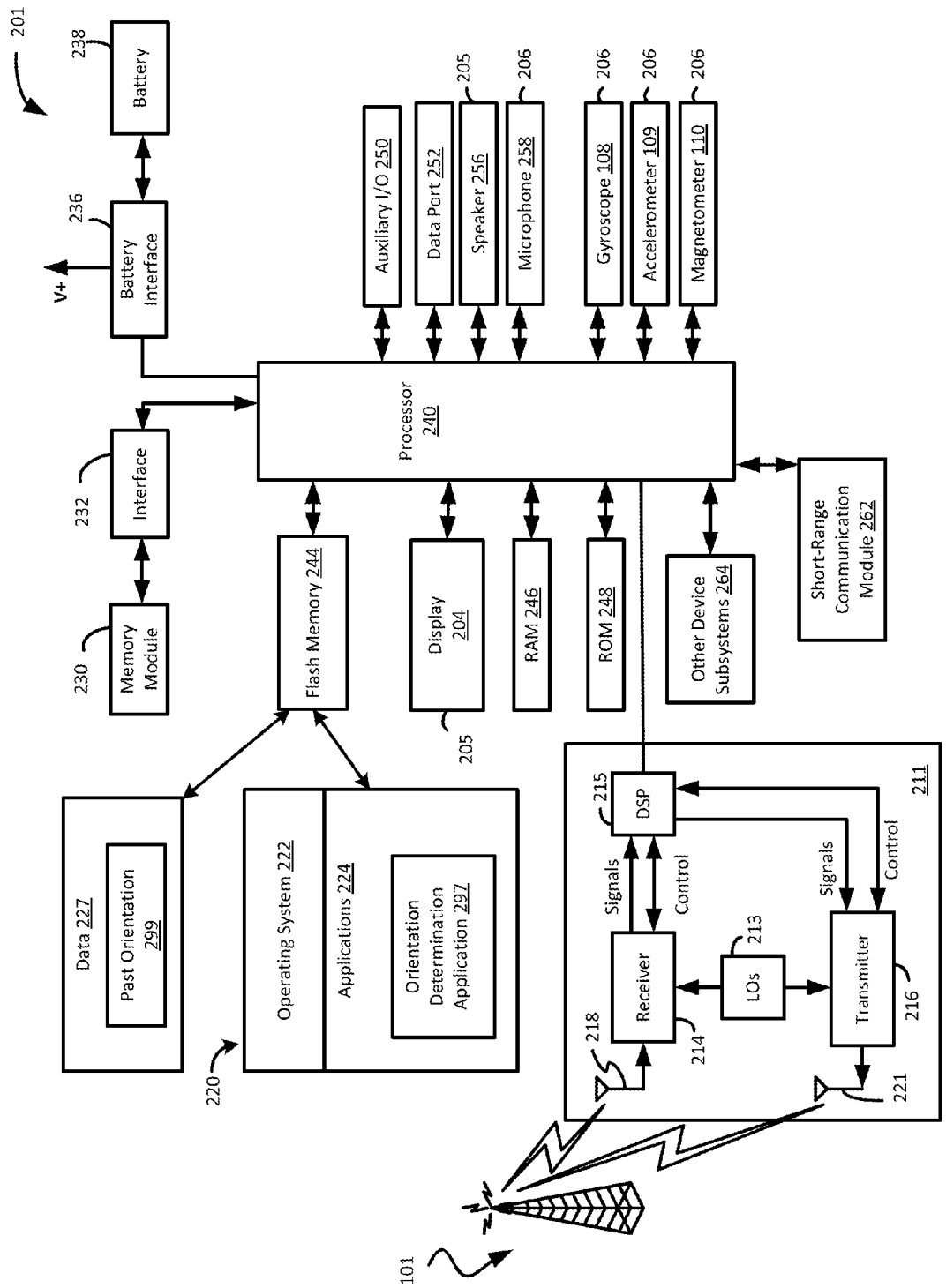
FIG. 2 is a block diagram of example components of an electronic device in accordance with example embodiments of the present disclosure.

Referring now to FIG. 2, a block diagram of an example electronic device 201 is illustrated. The electronic device 201 of FIG. 2 may include a housing which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 interacts with additional device subsystems including one or more input interfaces 206 (such as a keyboard, one or more control buttons, one or more microphones 258, one or more cameras, a gyroscope 108, an accelerometer 109, a magnetometer 110 and/or a touch-sensitive overlay associated with a touchscreen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces 205 (such as a display 204 (which may be a liquid crystal display (LCD)), one or more speakers 256, or other output interfaces), a short range communication module 262, and other device subsystems generally designated as 264. Some of the subsystems shown in FIG. 2 perform communication-related functions, whereas other subsystems may provide "resident" or on-device functions.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface 206 and the processor 240 interacts with the touch-sensitive overlay via the electronic controller. That is, the touchscreen display acts as both an input interface 206 and an output interface 205.

The communication subsystem 211 includes a receiver 214, a transmitter 216, and associated components, such as one or more antenna elements 218 and 221, local oscillators (LOs) 213, and a processing module such as a digital signal processor (DSP) 215. The antenna elements 218 and 221 may be embedded or internal to the electronic device 201 and a single antenna may be shared by both receiver 214 and transmitter 216, as is known in the art. The particular design of the wireless communication subsystem 211 depends on the wireless network 101 in which the electronic device 201 is intended to operate.

The electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 215. In a similar manner, signals to be transmitted are processed, including modulation and encoding, for example, by the DSP 215. These DSP-processed signals are input to the transmitter 216 for digital-to-analog (D/A) conversion, frequency up conversion, filtering, amplification, and transmission to the wireless network 101 via the antenna 221. The DSP 215 not only processes communication signals, but may also provide for receiver and transmitter control. For example, the gains applied to communication signals in the receiver 214 and the transmitter 216 may be adaptively controlled through automatic gain control algorithms implemented in the DSP 215.

In some example embodiments, the auxiliary input/output (I/O) subsystems 250 may include an external communication link or interface, for example, an Ethernet connection. The electronic device 201 may include other wireless communication interfaces for communicating with other types of wireless networks; for example, a wireless network such as an orthogonal frequency division multiplexed (OFDM) network.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network 101. The data 227 may also include user application data such as email messages, address book and contact information, calendar and schedule information, notepad documents, images, and other commonly stored user information stored on the electronic device 201 by its user, and other data.

The data 227 may include a past orientation 299. The past orientation 299 may be an orientation estimate for the electronic device 201 which was previously determined. The past orientation 299 may be used, for example, to allow the electronic device 201 to determine an orientation of the electronic device 201 from the gyroscope readings obtained from the gyroscope 108. That is, the past orientation 299 may serve as a base or starting point for determining orientation from gyroscope readings. Gyroscope readings may not, taken alone, provide the electronic device 201 with enough information to determine the electronic device's orientation. However, gyroscope readings, when coupled with a starting point or base point (such as the past orientation 299) may provide the electronic device 201 with information which allows the electronic device 201 to determine the orientation.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

Because the past orientation 299 may be current (i.e. representative of a current orientation of the electronic device 201 as measured by one or more of the gyroscope 108, accelerometer 109 and magnetometer 110) for only a short period of time, the past orientation 299 can be stored in a temporary storage. For example, the past orientation 299 may be stored in an area of memory which is reserved for storing transient data. Each time a reading is obtained for one or more sensor (e.g. accelerometer, magnetometer and/or gyroscope) for one or more axis with respect to that sensor, the orientation of the electronic device 201 may be calculated and stored as the past orientation 299. For example, if a reading is obtained with respect to the x-axis of the gyroscope (indicating rotation of the electronic device 201 about the gyroscope's x-axis) then the orientation will be calculated as being the past orientation 299 that has been rotated by an amount equal to the obtained rotation about the x-axis of the gyroscope 108. This new orientation calculation can then be stored as the past orientation 299. By way of further example, a reading can be obtained from the accelerometer 109 and/or magnetometer 110 indicating an absolute orientation of the electronic device 201. The absolute orientation can be considered the orientation of the electronic device relative to the Earth's axes. In one or more embodiments, this absolute orientation is calculated using the readings obtained from the accelerometer 109 and/or magnetometer 110. The absolute orientation can then be stored as the past orientation 299.

The data port 252 may be used for synchronization with a user's host computer system. The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer for processing.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication module 262 provides for communication between the electronic device 201 and different systems or devices, which need not necessarily be similar devices. For example, the short-range communication module 262 may include an infrared device and associated circuits and components, or a wireless bus protocol compliant communication mechanism such as a Bluetooth® communication module to provide for communication with similarly-enabled systems and devices.

The electronic device 201 includes a gyroscope 108 that is configured to sense rotation of the electronic device 201. The gyroscope 108 may, in at least some embodiments, be a three-axis gyroscope of the type described above with reference to FIG. 1. The electronic device 201 also includes an accelerometer 109 and/or a magnetometer 110 which may be of the types described above with reference to FIG. 1.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network 101, the auxiliary I/O subsystem 250, the data port 252, the short range communication module 262, or other suitable device subsystems 264. The downloaded programs or code modules may be permanently installed; for example, written into the program memory (e.g. the flash memory 244), or written into and executed from the RAM 246 for execution by the processor 240 at runtime.

In some example embodiments, the electronic device 201 may provide two principal modes of communication: a data communication mode and a voice communication mode. In the data communication mode, a received data signal such as a text message, an email message, or webpage download will be processed by the communication subsystem 211 and input to the processor 240 for further processing. For example, a downloaded webpage may be further processed by a web browser or an email message may be processed by the email messaging application and output to the display 204. A user of the electronic device 201 may also compose data items, such as email messages; for example, using an input interface 206 in conjunction with the display 204. These composed items may be transmitted through the communication subsystem 211 over the wireless network 101.

In the voice communication mode, the electronic device 201 provides telephony functions and may operate as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input devices). Alternative voice or audio I/O subsystems, such as a voice message recording subsystem, may also be implemented on the electronic device 201. Although voice or audio signal output may be accomplished primarily through the speaker 256, the display 204 may also be used to provide an indication of the identity of a calling party, duration of a voice call, or other voice call related information.

The processor 240 operates under stored program control and executes software modules 220 stored in memory such as persistent memory; for example, in the flash memory 244. As illustrated in FIG. 2, the software modules 220 may include operating system software 222 and one or more additional applications 224 or modules such as, for example, an orientation determination application 297.

In the example embodiment of FIG. 2, the orientation determination application 297 is illustrated as being implemented as a stand-alone application 224. However, in other example embodiments, the orientation determination application 297 could be provided or performed by another application or module such as, for example, the operating system software 222. Further, while the orientation determination application 297 is illustrated with a single block, the functions or features provided by the orientation determination application 297 could, in at least some embodiments, be divided up and implemented by a plurality of applications and/or modules.

Further, while, in the example embodiment of FIG. 2, the orientation determination application 297 is illustrated as being associated with the main processor 240 of the electronic device 201, in other embodiments, the orientation determination application 297 could be associated with another processor, or group of processors. For example, in some embodiments, the gyroscope 108, accelerometer 109 and/or magnetometer 110 may include or be connected to a secondary processor. The secondary processor may provide a narrow set of functions or features and may be used to offload some processing from the main processor 240. For example, in some embodiments, the secondary processor is a sensor-specific processor which is configured to provide sensor-related functions such as those provided by the orientation determination application 297. For example, the secondary processor may be configured to determine an orientation of the electronic device. The orientation determination application 297 is, in at least some embodiments, configured to determine an orientation for the electronic device 201.

The electronic device 201 may include a range of additional software applications 224, including, for example, a notepad application, voice communication (i.e. telephony) application, mapping application, a media player application, or any combination thereof. Each of the software applications 224 may include layout information defining the placement of particular fields and graphic elements (e.g. text fields, input fields, icons, etc.) in the user interface (i.e. the display 204) according to the application.

The software modules 220 or parts thereof may be temporarily loaded into volatile memory such as the RAM 246. The RAM 246 is used for storing runtime data variables and other types of data or information. Although specific functions are described for various types of memory, this is merely one example, and a different assignment of functions to types of memory could also be used.

Calculating Orientation

In accordance with one or more exemplary embodiments, the orientation of the electronic device 201 can be calculated using the readings from one or more sensors (e.g. the accelerometer 109, gyroscope 108 and/or magnetometer 110).

As noted above, the past orientation 299 of the electronic device can be stored in memory 244. The past orientation 299 can be the most recently calculated orientation values of the electronic device 201. In other words, for example, the past orientation 299 is the most recently determined orientation of the electronic device 201. Each time the orientation values of the electronic device 201 are recalculated they may be stored as the past orientation 299.

The orientation values (e.g. the past orientation 299) can be stored in memory 244 on the electronic device 201 as one or more numerical values, which may be ordered. For example, the orientation values can be stored as a matrix (e.g. an "orientation matrix"). In accordance with an exemplary embodiment, the orientation matrix is an orthogonal matrix in which the columns and rows are orthogonal unit vectors representing the position of three orthogonal axes of the electronic device 201 relative to the Earth's axes. The three axes of the electronic device 201 can be aligned with the three axes of each of the gyroscope 108, accelerometer 109, and magnetometer 110. For example, Gx, Ax and Mx can be aligned and can be directed out of a side of the electronic device 201; Gy, Ay and My can be aligned and can be directed out of the top of the electronic device 201; and Gz, Az and Mz can be aligned and can be directed out of the front face of the electronic device 201. The orientation matrix may also be referred to as a rotation matrix or attitude matrix.

In accordance with an exemplary embodiment, gyroscope readings can be used to calculate a current orientation of the electronic device 201. For example, readings can be obtained from one or more of the gyroscope axes Gx, Gy, Gz at the electronic device 201. Such readings can indicate a rotation about the one or more gyroscope axes Gx, Gy, Gz. The rotation readings from the one or more gyroscope axes Gx, Gy, Gz can be applied to the past orientation 299 in order to determine a current orientation of the electronic device 201.

The gyroscope 108 can take periodic samples of gyroscope readings from one or more of its sensing axes Gx, Gy, Gz. The gyroscope 108 may only measure relative rotation and as such the electronic device 201 relies on the past orientation 299 together with the gyroscope readings to determine the current orientation of the electronic device 201. When a sample indicates that there is movement in respect of one or more of the sensing axes, the processor can calculate the orientation values using the gyroscope readings and the past orientation 299. The past orientation 299 is then updated with the newly calculated orientation values. However, there may be times when the gyroscope readings include or incorporate a small error, which leads to the newly calculated orientation values having a small error. This error may then be compounded due to the fact that the past orientation 299 (with the error) will be used in connection with the new gyroscope readings (with a new error) to update the orientation values. A further gyroscope error can also be caused by "drift" for example.

To counteract such an error, the past orientation 299 can be updated (or corrected) to a reference point. The reference point can be calculated as the absolute orientation of the electronic device 201 using readings from the accelerometer 109 and/or the magnetometer 110. After the reference point is calculated, the past orientation 299 may be updated to be equal to the reference point.

However, if the error resulting from readings taken from the gyroscope 108 is corrected too quickly (e.g. immediately), the change in the orientation values of the electronic device 201 (effected in order to make the correction) may appear jumpy and may provide a poor user experience. On the other hand, if the error resulting from readings taken from the gyroscope 108 is corrected too slowly, the orientation values may be incorrect for a relatively long time, which may also provide a poor user experience. To address this issue, the reference point can be determined while the electronic device 201 is still or is moving below a threshold amount and the orientation values can then be corrected while the device is in motion.

Updating the past orientation 299 using a reference point can be performed at periodic intervals. Further, updating the past orientation 299 using a reference point can be performed while the electronic device 201 is in motion and can be performed at period intervals in proportion to the motion of the electronic device 201. For example, while the electronic device 201 is not moving (or is moving an amount below a predetermined threshold), the reference point can be determined from readings obtained by the accelerometer 109 and magnetometer 110. The reference point can be used to determine that the past orientation 299 needs to be corrected to increase the x-axis rotation by an additional 5 degrees. Continuing with the example, when the electronic device 201 is in motion (e.g. when a rotational movement is sensed) the past orientation 299 can be corrected using the reference point. The correction can be applied to the past orientation 299 in intervals and in proportion to the motion of the electronic device 201. For example, the x-axis rotation can be updated by one degree for every degrees of motion at periodic intervals while the electronic device 201 is in motion. By way of further example, the x-axis rotation can be updated by one degree at periodic intervals while the electronic device 201 is rotating about its x-axis in the direction of the correction. In an alternative embodiment, the past orientation 299 can be corrected at one instance (rather than at periodic intervals) while the electronic device 201 is in motion so that the past orientation 299 is changed all at once.

In accordance with an exemplary embodiment, the electronic device 201 calculates the reference point using the readings from one or more sensors. The reference point can be an absolute orientation of the electronic device 201 and the one or more sensors can be the accelerometer 109 and the magnetometer 110. In other words the reference point can represent the orientation of the electronic device 201 relative to the Earth's axes. The reference point can be calculated using the most recent readings from the accelerometer 109 and the magnetometer 110. For example, the accelerometer readings (e.g. from the accelerometer axes Ax, Ay, Az) can provide an orientation or positioning of the device relative to the gravitational forces acting on the device and the magnetometer readings (e.g. from the magnetometer axes Mx, My, Mz) can provide an orientation or positioning of the device relative to the Earth's magnetic field (assuming there are no interfering objects nearby). A partial reference point can be calculated using only the accelerometer 109 or only the magnetometer 110, for example.

However, the reference point of the electronic device 201 may be determined when there is interference with one or more of the accelerometer 109 and magnetometer 110. For example, the electronic device 201 and its associate magnetometer 110 may be near an interfering object such as a metallic table or a substantial magnetic field other than the Earth's magnetic field. A calculation of the reference point in the presence of such interference can cause an incorrect reference point calculation. Thus, if the past orientation 299 is updated or corrected based on the incorrect reference point, then the past orientation 299 will also be incorrect, which means that newly calculated orientation values that are based on gyroscope readings and the past orientation 299 will be incorrect.

To address this issue, the orientation values (e.g. the past orientation 299) can be locked while the electronic device 201 is stationary. In accordance with an embodiment, readings can still be obtained from the sensors (e.g. the gyroscope 108, accelerometer 109 and magnetometer 110) but the readings may not be used to update the orientation values while the orientation values are unlocked. However, readings from one or more of the sensors can be used to determine if the electronic device 201 is in motion. If it is determined that the electronic device 201 is in motion then the orientation values may be unlocked. In another embodiment, the sensors can be in reduced reporting mode while the electronic device 201 is stationary. For example, the sensors can obtain readings at a reduced rate while in reduced reporting mode. Similarly, the orientation values can be corrected to a reference point at a reduced rate (i.e. less often) while the electronic device 201 is stationary.

Stabilizing the Orientation Values

In the following description, reference will be made to FIG. 3 which illustrates, in flowchart form, a method 300 of stabilizing the orientation values of an electronic device 201. The method 300 may include features which may be provided by an electronic device 201, such as the electronic device 201 of FIGS. 1 and 2. For example, one or more applications or modules associated with an electronic device 201, such as the orientation determination application 297 (FIG. 2), may contain processor readable instructions for causing a processor associated with the electronic device 201 to perform the method 300 of FIG. 3. That is, in at least some example embodiments, the electronic device 201 may be configured to perform the method 300. For example, the method 300 may be implemented by a processor 240 (FIG. 2) of an electronic device 201 (FIG. 2).

In at least some embodiments, one or more of the functions or features of one or the method 300 may be performed, in whole or in part, by another system, software application, module, component or device apart from those specifically listed above. For example, in some embodiments, the method 300 may be performed by a processor associated with the gyroscope 108, the accelerometer 109 and/or the magnetometer 110. That is, in at least some embodiments, the method 300 or a portion thereof may be performed by a processor other than the main processor the electronic device 201. For example, a separate processor may be configured for the specific purpose of performing the method 300 or a portion thereof.

Figure 3:
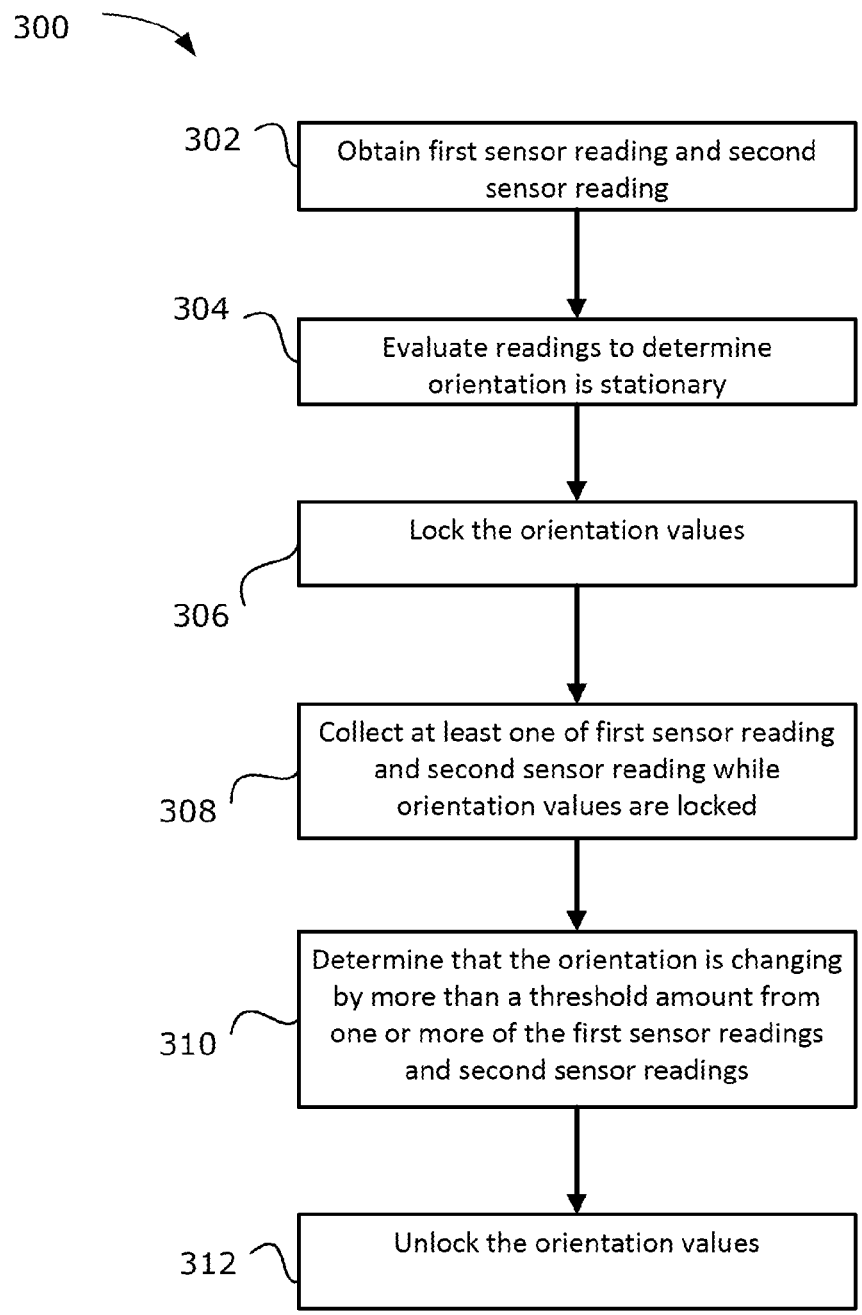
FIG. 3 is a flowchart of an example method of stabilizing the orientation values of an electronic device in accordance with example embodiments of the present disclosure; and, FIG. 4 is a flowchart of an example method of stabilizing the orientation values of an electronic device in accordance with example embodiments of the present disclosure.

The method 300 illustrated in FIG. 3 is a method of stabilizing the orientation values of an electronic device 201. In accordance with the illustrated embodiment, the electronic device 201 has a first sensor for obtaining first sensor readings and a second sensor for obtaining second sensor readings. The orientation values represent an orientation of the electronic device 201 and can be calculated based on the first sensor readings and the second sensor readings.

At 302 a first sensor reading and a second sensor reading are detected. In one or more embodiments the first sensor reading represents a change in movement of the first sensor relative to one or more orthogonal sensing axes of the first sensor. For example, the first sensor can be a gyroscope 108 and the second sensor can be an accelerometer 109. In accordance with one or more embodiments a third sensor reading is detected. The third sensor can be a magnetometer 110. The third sensor (e.g. the magnetometer 110) can collect third sensor readings (e.g. magnetometer sensor readings).

At 304 the first sensor reading and second sensor reading are evaluated to determine that the orientation of the electronic device 201 is stationary. According to the example in which the first sensor is a gyroscope 108 and the second sensor is the accelerometer 109, the evaluation can be performed by comparing the orientation calculated using the accelerometer readings and the gyroscope readings to the past orientation 299 (or most recently calculated orientation). If there is no difference between the two calculations, or if the difference between the two calculations is less than a predetermined threshold, then the electronic device 201 can be considered stationary. Similar computations can be performed when the first sensor and the second sensor comprise different types of sensors. Similarly, readings can also be obtained from a third sensor (e.g. a magnetometer 110) at 304, which can then be used in the evaluation of whether the electronic device 201 is stationary.

At 306, the orientation values are locked after it is determined that the electronic device 201 is stationary. In accordance with one or more embodiments, the orientation values stored at the electronic device 201 can comprise the most recent past orientation 299, which would be the orientation values representing the stationary position of the electronic device 201 (due to the fact that it has been determined that the electronic device 201 is stationary at 304). When the orientation values are locked, they remain unchanged regardless of the readings obtained from any of the sensors. In other words, the past orientation 299 is not updated while the orientation values are locked.

At 308, at least one of the first sensor reading or the second sensor reading is collected while the orientation values are locked. For example, the electronic device 201 can evaluate sensor readings from the gyroscope 108 and/or the accelerometer 109. In a further embodiment, the sensor readings from a third sensor, such as a magnetometer 110 can also be collected while the orientation values are locked.

At 310, it is determined from the sensor readings taken while the orientation values are locked that the orientation of the electronic device 201 is changing by more than a threshold amount from the stationary position. For example, the sensor readings may be used to calculate an orientation of the electronic device 201, which is then compared to the past orientation 299. If the newly calculated orientation of the electronic device 201 is more than a threshold amount different (in respect of one or more of the axes for example) then the electronic device 201 is considered to be changing more than the threshold amount. The threshold amount can be an amount of rotation about one or more axes (e.g. 1 degree about the x-axis, y-axis and/or z-axis of the electronic device 201). Alternatively or additionally the threshold amount may include a linear amount in respect of one or more axes (e.g. 1 mm along one or more of the x-axis, y-axis and z-axis). In accordance with an exemplary embodiment, determining that the orientation of the electronic device 201 is changing by more than a threshold amount includes determining that the gyroscope readings indicate that the electronic device 201 is rotating at a rate above the noise level of the gyroscope in respect of one or more sensing axes. In one or more alternative embodiments, the threshold can be a predetermined or an application dependent value.

At 312, the orientation values are unlocked. After the orientation values are unlocked the electronic device 201 can update the orientation values based on the readings from one or more of the first sensor, second sensor and/or third sensor. For example, readings can be taken from the gyroscope 108, accelerometer 109 and/or magnetometer 110 and the orientation of the electronic device can be calculated based on such readings (such a calculation may also use the past orientation 299 stored in memory 244). The past orientation 299 can then be updated with the newly calculated orientation.

Figure 4:
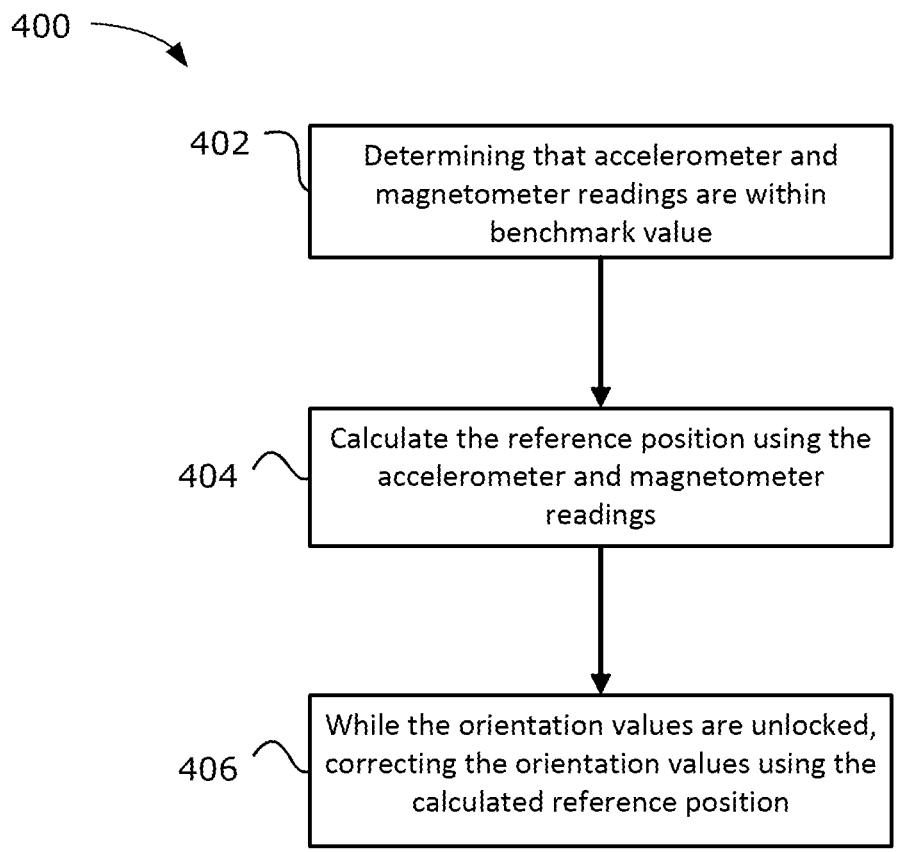

FIG. 4 shows example method 400 of stabilizing the orientation values of an electronic device 201.

At 402, it is determined that the readings from the accelerometer 109 and the magnetometer 110 are within one or more benchmark values. The readings taken from the accelerometer 109 and magnetometer 110 at 402 could have been obtained while the orientation values were or are locked. In one or more embodiments, only the readings obtained at 402 from either the magnetometer 110 or the accelerometer 109 or from a subset of the sensing axes for one or both of the magnetometer 110 and accelerometer 109 are determined to be within one or more benchmark values. In accordance with an exemplary embodiment, the reference position for the electronic device 201 can be determined using readings from the accelerometer 109 and magnetometer 110 taken at 402. By way of further example, all three sensing axes of the accelerometer 109 and all three sensing axes of the magnetometer 110 can be used to determine the reference position.

In one or more exemplary embodiments, readings that are within the benchmark value are readings from one or more of the accelerometer 109 and magnetometer 110 that are considered valid. Readings that are not considered valid can include readings from the magnetometer 110 that include substantial interference (such as placing the magnetometer 110 next to a metallic object) or readings for which a sensor is saturated.

An example of a benchmark value can be the past orientation 299 of the electronic device 201. Such a benchmark value is intended to capture situations in which the accelerometer 109 and/or magnetometer 110 readings indicate an orientation of the electronic device 201 that is substantially different from the past orientation 299. Such situations may be indicative of an invalid reading from one or more of the magnetometer 110 and accelerometer 109. As such, a benchmark value can include multiple values such as the values that are representative of each of the axes of the past orientation 299. For example, a benchmark value can be related to a single axis, such as the x-axis of the magnetometer 110. By way of further example, the benchmark value can include the range of values that are within a predetermined amount of the x-axis orientation of the electronic device 201 indicated in the past orientation 299. Readings could be obtained from each of the magnetometer 110 and accelerometer 109 which could (when evaluated and/or processed by the orientation calculation application 297) be used to calculate the orientation and/or positioning of the electronic device 201 with respect to the x-axis of the magnetometer 110. Such readings could then be compared to the x-axis value of the past orientation 299. If the readings indicate an x-axis orientation that is more than the benchmark value outside of the x-axis of the past orientation 299, then the new readings are not considered valid (i.e. the readings are not within the benchmark value). Similarly, a benchmark value could be the range of values that are within a predetermined amount of the y-axis configuration indicated in the past orientation 299; and/or the benchmark value could include the range of values that are within a predetermined amount of the z-axis configuration indicated in the past orientation 299. Thus, if the orientation determined by the readings from the magnetometer 110 and accelerometer 109 is not within the benchmark value with respect to the x-axis (and/or y-axis and/or z-axis) of the past orientation 299 then the magnetometer 110 and/or accelerometer 109 readings are not considered valid. In such an example, the orientation determined by the readings from the magnetometer 110 and accelerometer 109 would indicate an orientation that includes an x-axis configuration that is different from the past orientation 299 by more than a benchmark amount.

At 404, after it is determined that the readings from the accelerometer 109 and magnetometer 110 are within one or more benchmark values, a reference position is calculated using the readings obtained from the accelerometer 109 and magnetometer 110. The reference position can be the measured orientation of the electronic device 201 relative to the Earth's axes. For example, the orientation of the electronic device 201 can then be used in combination with a measurement that indicates the relative movement of the electronic device 201 around a sensing axis of the electronic device 201. By way of further example, the reference position can be measured using a first sensor and a second sensor (such as an accelerometer 109 and a magnetometer 110). In one or more embodiments, the reference position can be measured using one sensor (rather than more than one).

The reference position calculated at 404 can be stored in memory on the electronic device 201 to be used at a later time.

At 406, while the orientation values are unlocked, the orientation values are corrected using the reference position calculated at 404. For example, the orientation values are stored in memory associated with the electronic device 201. When the orientation values are unlocked, after readings are obtained from the gyroscope 208, the processor can correct the orientation values to reflect the change in relative orientation (i.e. relative to the existing orientation values) measured in respect of one or more of the gyroscope sensing axes Gx, Gy, Gz. The change in relative orientation can be retrieved from memory. For example, the orientation values can be corrected based on the reference position calculated at 404. In other words, the orientation values (e.g. the orientation matrix) be based on the reference position calculated at 404 and the measurements obtained from the gyroscope 108.

In accordance with one or more exemplary embodiments, the orientation values are corrected in proportion to the movement of the electronic device 201. For example, the orientation values are corrected with the reference position calculated at 404 in proportion to the change of movement represented by the gyroscope readings. For example, the reference position may indicate an orientation of the electronic device 201 that is different from the orientation values (or past orientation 299) due to an error in the previously calculated orientation values. This difference can be corrected so that the orientation values are updated to reflect the orientation of the device identified by the reference position. The correction may be applied gradually. For example, if the difference between the x-axis position of the orientation values and the x-axis position of the calculated reference position is 10 units, then the difference can be remedied (i.e. the orientation values can be updated in respect of the x-axis) one unit at a time (e.g. one unit within each of a predetermined time interval).

In one or more embodiments, the difference between the x-axis position of the orientation values stored in memory (e.g. the past orientation 299) and the x-axis position of the calculated reference position is remedied in proportion to the amount of change to the x-axis position that is sensed by the gyroscope 108. For example, for each incremental unit of rate rotation about the x-axis measured by the gyroscope 108, the orientation values may be corrected in respect of the rotational position about the x-axis by one unit of rotation. Thus, the reference position that is used along with the rotation measured by the gyroscope to calculate the orientation of the electronic device 201 is updated by a unit of rotation for each unit of rate of rotation as measured by the gyroscope 108. The units for which the x-axis will be corrected may be applied gradually depending on the measurements provided by the gyroscope's x-axis Gx. The unit of rate of rotation and the unit of rotation may be predetermined.

In accordance with one or more embodiments, correcting the orientation values in proportion to the change of movement represented by the gyroscope readings includes determining that that an obtained reading from the gyroscope 108 about an identified sensing axis indicates that the electronic device 201 is rotating about the identified sensing axis of a rate of at least a predetermined unit rate of rotation, and then correcting the orientation values by up to a predetermined unit of rotation. In a further example, correcting the orientation values by up to a predetermined unit of rotation is performed incrementally for each additional reading from the gyroscope 108 about an identified sensing axis indicates that the electronic device 201 is rotating about the identified sensing axis of a rate of at least an additional predetermined unit rate of rotation. In yet a further example, correcting the orientation values by up to a predetermined unit of rotation includes changing the orientation values in respect of the rotation about the identified sensing axis so that the orientation values in respect of the identified sensing axis is closer to the calculated reference position in respect of the identified sensing axis by an amount equal to or less than the predetermined unit of rotation.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable storage medium including program instructions recorded thereon (which may, for example, cause a processor to perform one or more of the methods described herein), or a computer data signal carrying computer readable program instructions may direct an apparatus to facilitate the practice of the described methods. Such apparatus, articles of manufacture, and computer data signals also come within the scope of the present disclosure.

The term "computer readable storage medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile/Video Disc (DVD) or Blu-ray™ Disc, and a solid state storage device (e.g., NAND flash or synchronous dynamic RAM (SDRAM)).

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

What is claimed is the following:

1. A processor-implemented method of stabilizing orientation values of an electronic device, the orientation values representing an orientation of the electronic device, the method comprising:

obtaining first sensor readings from a first sensor provided on the electronic device, the first sensor comprising a gyroscope;

obtaining second sensor readings from a second sensor provided on the electronic device;

evaluating the first sensor readings and the second sensor readings to determine whether the electronic device is stationary;

locking the orientation values when the electronic device is stationary, wherein locking configures the electronic device to prevent updating of the orientation values until the orientation values have been unlocked;

collecting at least one of further first sensor readings and further second sensor readings while the orientation values are locked;

determining whether the orientation of the electronic device is changing by more than a threshold amount based on one or more of the further first sensor readings and the further second sensor readings; and unlocking the orientation values for updating based on the further sensor readings when the orientation of the electronic device is changing by more than the threshold amount, wherein unlocking configures the electronic device to allow further updating of the orientation values.

2. The method of claim 1, further comprising updating the orientation values while the orientation values are unlocked based on the further first sensor readings, the further first sensor readings comprising a change in movement relative to one or more axes of the first sensor.

3. The method of claim 2, further comprising correcting the orientation values using a reference position determined using at least one of the further second sensor readings and third sensor readings, the third sensor readings obtained from a third sensor while the orientation values are locked.

4. The method of claim 3, wherein the second sensor is an accelerometer and the third sensor is a magnetometer.

5. The method of claim 4, further comprising
determining that the further accelerometer readings and the magnetometer readings are within a benchmark value;
calculating the reference position using the further accelerometer readings and the magnetometer readings; and
while the orientation values are unlocked, correcting the orientation values using the calculated reference position.

6. The method of claim 5, wherein determining that the further accelerometer readings and the magnetometer readings are within a benchmark value comprises determining that there is substantially no interference with magnetometer readings and accelerometer readings.

7. The method of claim 5, wherein correcting the orientation values with the calculated reference position is performed in proportion to movement represented by the gyroscope readings.

8. The method of claim 7, wherein correcting the orientation values in proportion to the movement represented by the gyroscope readings comprises:
determining that that an obtained reading from the gyroscope about an identified sensing axis indicates that the electronic device is rotating about the identified sensing axis at a rate of at least a predetermined unit rate of rotation; and
correcting the orientation values by up to a predetermined unit of rotation.

9. The method of claim 8, wherein correcting the orientation values by up to a predetermined unit of rotation is performed incrementally for each additional reading obtained from the gyroscope.

10. The method of claim 8, wherein correcting the orientation values by up to a predetermined unit of rotation comprises changing the orientation values in respect of the rotation about the identified sensing axis so that the orientation values in respect of the identified sensing axis are closer to the calculated reference position in respect of the identified sensing axis by an amount equal to or less than the predetermined unit of rotation.

11. The method of claim 4, wherein determining that the orientation of the electronic device is changing by more than a threshold amount comprises determining that the gyroscope readings indicate that the electronic device is rotating at a rate above the noise level of the gyroscope in respect of one or more sensing axes.

12. The method of claim 1, wherein the orientation values comprises an orientation matrix representing the orientation of the electronic device relative to the Earth's axes.

13. The method of claim 12, wherein locking the orientation values comprises maintaining the orientation matrix as static values.

14. The method of claim 13, wherein unlocking the orientation measurement comprises dynamically updating the orientation matrix based on one or more of first sensor readings and second sensor readings.

15. An electronic device comprising:
a memory;
a first sensor for providing first sensor readings in respect of at least one first sensor axis, the first sensor comprising a gyroscope;
a second sensor for providing second sensor readings in respect of at least one second sensor axis; and,
a processor coupled to the memory, the first sensor, and the second sensor the processor being configured to stabilize the orientation values of the electronic device by:
obtaining first sensor readings from the first sensor;
obtaining second sensor readings from the second sensor;
evaluating the first sensor readings and the second sensor readings to determine whether the electronic device is stationary;
locking the orientation values when the electronic device is stationary, wherein locking configures the electronic device to prevent updating of the orientation values until the orientation values have been unlocked;
collecting at least one of further first sensor readings and further second sensor readings while the orientation values are locked;
determining whether the orientation of the electronic device is changing by more than a threshold amount based on one or more of the further first sensor readings and the further second sensor readings; and
unlocking the orientation values for updating based on the further sensor readings when the orientation of the electronic device is changing by more than the threshold amount, wherein unlocking configures the electronic device to allow further updating of the orientation values.

16. The electronic device of claim 15, wherein the processor is further configured to update the orientation values while the orientation values are unlocked based on the further first sensor readings, the further first sensor readings comprising a change in movement relative to one or more axes of the first sensor.

17. The electronic device of claim 16 further comprising a third sensor for providing third sensor readings, and wherein the processor is further configured to correct the orientation values using a reference position determined using at least one of the further second sensor readings and the third sensor readings.

18. The electronic device of claim 17 wherein second sensor is an accelerometer and the third sensor is a magnetometer.

19. The electronic device of claim 18, wherein the processor is further configured to:

determine that the further accelerometer readings and the magnetometer readings are within a benchmark value;

calculate the reference position using the further accelerometer readings and the magnetometer readings; and while the orientation values are unlocked, correct the orientation values using the calculated reference position.

20. A non-transitory computer readable storage medium comprising computer-executable instructions for controlling sensor use on an electronic device by:

obtaining first sensor readings from a first sensor provided on the electronic device, the first sensor comprising a gyroscope;

obtaining second sensor readings from a second sensor provided on the electronic device;

evaluating the first sensor readings and the second sensor readings to determine that the orientation of the electronic device is stationary;

locking the orientation values, wherein locking configures the electronic device to prevent updating of the orientation values until the orientation values have been unlocked;

collecting at least one of first sensor readings and second sensor readings while the orientation values are locked;

determining that the orientation of the electronic device is changing by more than a threshold amount based on one or more of the first sensor readings and second sensor readings collected while the orientation values were locked; and unlocking the orientation values, wherein unlocking configures the electronic device to allow further updating of the orientation values.

\* \* \* \* \*